United States Patent [19]

Kim

[11] Patent Number: 6,101,162

[45] Date of Patent: Aug. 8, 2000

[54] METHOD AND APPARATUS FOR INITIALIZING REWRITABLE RECORDING MEDIA

[75] Inventor: Dae Young Kim, Seoul, Rep. of Korea

[73] Assignee: LG Electronics Inc., Seoul, Rep. of Korea

[21] Appl. No.: 09/179,565

[22] Filed: Oct. 27, 1998

[30] Foreign Application Priority Data

Oct. 28, 1997 [KR] Rep. of Korea ...................... 97-55600

[51] Int. Cl.[7] .................................................. G11B 17/22
[52] U.S. Cl. ................... 369/124.01; 369/32; 369/44.27; 714/710; 714/719
[58] Field of Search .............................. 369/124.01, 50, 369/54, 47, 36, 34, 32, 58, 44.27; 714/719, 710; 711/115, 221

[56] References Cited

U.S. PATENT DOCUMENTS

| 5,025,431 | 6/1991 | Naito | 369/36 |
| 5,359,623 | 10/1994 | Nakamura | 369/32 |
| 5,404,357 | 4/1995 | Ito et al. | 714/719 |
| 5,453,974 | 9/1995 | Minoda et al. | 369/275.1 |
| 5,526,335 | 6/1996 | Tamegai | 369/58 |
| 5,699,549 | 12/1997 | Cho | 711/115 |
| 5,724,328 | 3/1998 | Yanagi | 369/50 |

*Primary Examiner*—John W. Cabeca
*Assistant Examiner*—Kim-Kwok Chu

[57] ABSTRACT

A method and apparatus for initializing a rewritable recording medium that can perform an initialization while recording a data. In the method, it is performed a determination as to whether or not an initialization for the loaded recording medium should be performed. Further, the initialization for each predetermined physical unit of the recording medium is performed in accordance with the determined result. According to the method, it becomes possible to assure the responsibility of a recorded data without requiring an additional time for the initialization operation like in the Prior art by recording and certifying a data for each predetermined physical unit when the drive determines whether or not a loaded recording medium has been initialized to record a user data onto the non-initialized area.

22 Claims, 5 Drawing Sheets

METHOD AND APPARATUS FOR INITIALIZING REWRITABLE RECORDING MEDIA

BACKGROUND OF THE INVENTION

1. Field of the Invention

This invention relates to an initialization of a rewritable recording medium, and more particularly to a method and apparatus for initializing a rewritable recording medium that allows a data recording and its initialization to be performed.

2. Description of Related Art

Generally, a rewritable recording medium requires its initialization process prior to a data recording. This initialization process is classified into a physical initialization and a logical initialization. The physical initialization means such a process that divides the entire area of a recording medium into each sector unit to give an address and detects a defect area to register it into a specified area. The logical initialization means such a process that divides the recording medium into each corresponding area in accordance with the standard for a convenient recording/reproduction and a changeability between each recording medium. In this physical initialization process, a certification process of detecting and registering the defect area is an important process for assuring the responsibility, but it has a problem in that it requires too much time. Accordingly, it must wait for a considerably long time required for the initialization process so as to record a data onto the recording medium. Also, it causes the cost increase when a recording medium manufacturer carries out the initialization.

FIG. 1 is a schematic block diagram showing the configuration of a drive for driving the conventional rewritable recording medium. In FIG. 1, the drive 10 is connected to a host computer 20 to record a user data applied from the host computer 20 onto the recording medium under control of the host computer 20, and to reproduce the user data from the recording medium and transfer the reproduced data to the host computer.

FIG. 2 is a flow chart for explaining an initializing method of the conventional rewritable recording medium. Referring to FIG. 2, in steps 1 and 2, if a rewritable recording medium is loaded into the medium in the drive 10, then a drive 10 is initialized. Then, the host computer 20 executes an initializing program under an initialization command from a user and, at the same time, transfers the successive commands to the drive 10. Accordingly, in steps 3 and 4, the drive 10 responds a command transferred from the host computer 20 to perform a recording or reproducing operation with respect to the recording medium, thereby initializing the recording medium.

In the initialization process of the recording medium, the drive 10 firstly performs a physical initialization for the recording medium. More specifically, the drive 10 records a certain data, that is, a test data onto each sector and thereafter reproduces the recorded data to thereby perform certification process for confirming an error occurrence. If an error is detected beyond the standard in the certification process to be considered as a bad sector, then the bad sector is registered into a specified area of the recording medium.

When such a physical initialization process is completed, the drive 10 performs a logical initialization for the recording medium under control of the host computer 20. This logical initialization standard is different depending on a type of recording media, but there is a tendency to converge into an existing standard for the purpose of a changeability between the media and a changeability between the computers. For example, the logical standard applied to a DVD-RAM is as shown in FIG. 3.

In FIG. 3, the front part and the rear part of the physical area given an address in a sector unit is set to a lead-in area 12 and a lead-out area 18, thereby allowing the drive 10 to be used optionally. The remaining area is a logical area in which a user data can be recorded. The logical area is set to a manager area 14 and a user data area. The standard of the manager area 14 may be different depending upon the standard of a recording medium. Also, it is prescribed in the DVD-RAM standards that a defect management area(DMA) should be included in the physical area. Accordingly, the DMA is established in the lead-in area 12 and the lead-out area 18.

As described above, the rewritable recording medium does not enter a state in which a user data can be recorded until the physical and logical initialization is performed. The certification process occupying a time more than 99% of the initialization process is an important factor in light of an assurance of data integrity, but it has a drawback in that it requires a considerably long time. Accordingly, such certification takes a long time in the initialization process. Particularly, a DVD-RAM, which is a recording medium having a very large capacity, requires 2 to 3 hours for the initialization process. Moreover, an additional 2 to 3 hours is required when such an initialization for the recording medium is performed by a manufacturer of the recording medium, thereby causing a rise in the cost. Further, a recording medium propagated in a state in which the initialization is not performed for the purpose of the low price product, can not record a desired data until a user performs the initialization requiring about 2 to 3 hours. In the rewritable optical disc, a recording face is deteriorated due to the repeated recording and reproduction to thereby increase the number of bad sectors. Accordingly, it is necessary to provide a re-initialization for the recording medium when many bad sectors exist due to the repeated recording and reproduction. As a result, the initialization process of the recording medium requiring a considerably long time has emerged as a problem to be overcome in light of a tendency toward a larger capacity in the recording medium.

SUMMARY OF THE INVENTION

Accordingly, it is an object of the present invention to provide a method and apparatus for initializing a rewritable recording medium that is adaptive for a large capacity of recording medium.

Further object of the present invention is to provide a method and apparatus for initializing a rewritable recording medium that can assure the responsibility of a data recorded without incurring an additional time for an initialization of the recording medium by performing the initialization of the recording medium in the course of recording a data.

Still further object of the present invention is to provide a method and apparatus for initializing a rewritable recording medium that can record a data even when the entire area of the recording medium is not initialized.

In order to achieve these and other objects of the invention, a method of initializing a rewritable recording medium according to one aspect of the present invention includes the steps of determining whether or not an initialization for the loaded recording medium should be performed; and performing the initialization for each predetermined physical unit of the recording medium in accordance with a result in the determining step.

A method of initializing a rewritable recording medium according to another aspect of the present invention includes the steps of reading out a position information of a non-initialized area recorded on a predetermined area of the loaded recording medium; detecting the presence of a recording command for recording a user data on the recording medium; setting an initialization mode in accordance with a result in the detecting step; and initializing the non-initialized area for each predetermined physical unit in accordance with the initialization mode.

A method of initializing a rewritable recording medium according to still another aspect of the present invention includes the steps of reading out a position information of a non-initialized area recorded on a predetermined area of the loaded recording medium; setting a recording mode for recording a user data on a basis of the position information of the non-initialized area and a position information to be recorded with the user data; and recording the user data for each predetermined physical unit in accordance with the recording mode.

An initializing apparatus for a rewritable recording medium according to still another aspect of the present invention includes means for reading out a position information of a non-initialized area recorded on a predetermined area of a loaded recording medium; means for detecting the presence of a recording command for recording a user data on the recording medium; means for setting an initialization mode in accordance with a detected result as to the presence of the recording command; and means for initializing the non-initialized area for each predetermined physical unit in accordance with the initialization mode.

An initializing apparatus for a rewritable recording medium according to still another aspect of the present invention includes means for reading out a position information of a non-initialized area recorded on a predetermined area of a loaded recording medium; means for setting a recording mode for recording a user data on a basis of the position information of the non-initialized area and a position information to be recorded with the user data; and means for recording the user data for each predetermined physical unit in accordance with the recording mode.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 4:
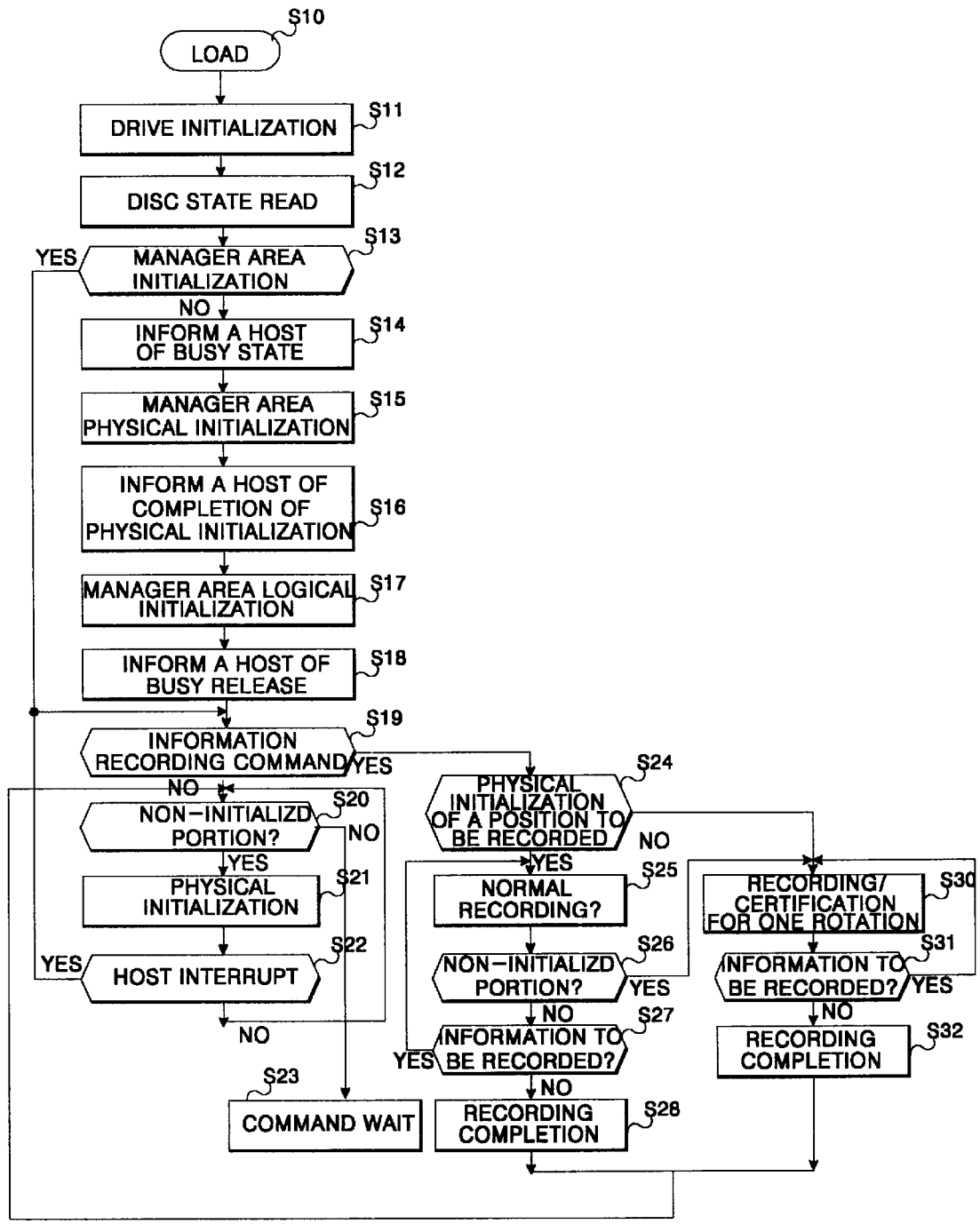
FIG. 4 is a flow chart for explaining a rewritable recording medium initializing method according to an embodiment of the present invention step by step.

Referring to FIG. 4, there is shown a flow chart for explaining a method of initializing a rewritable recording medium according to an embodiment of the present invention step by step.

Figure 1:
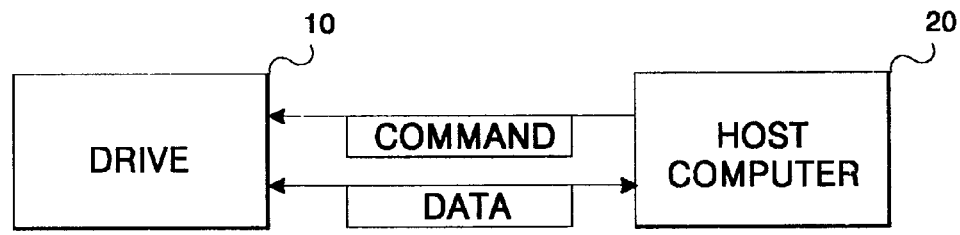
FIG. 1 is a schematic block diagram showing the configuration of a conventional drive control system.
Figure 2:
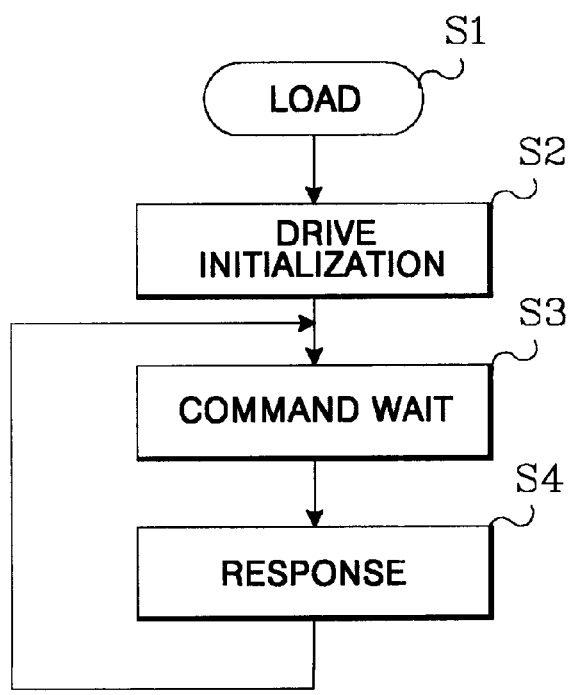
FIG. 2 is a flow chart for explaining a conventional recording medium initializing method.
Figure 3:
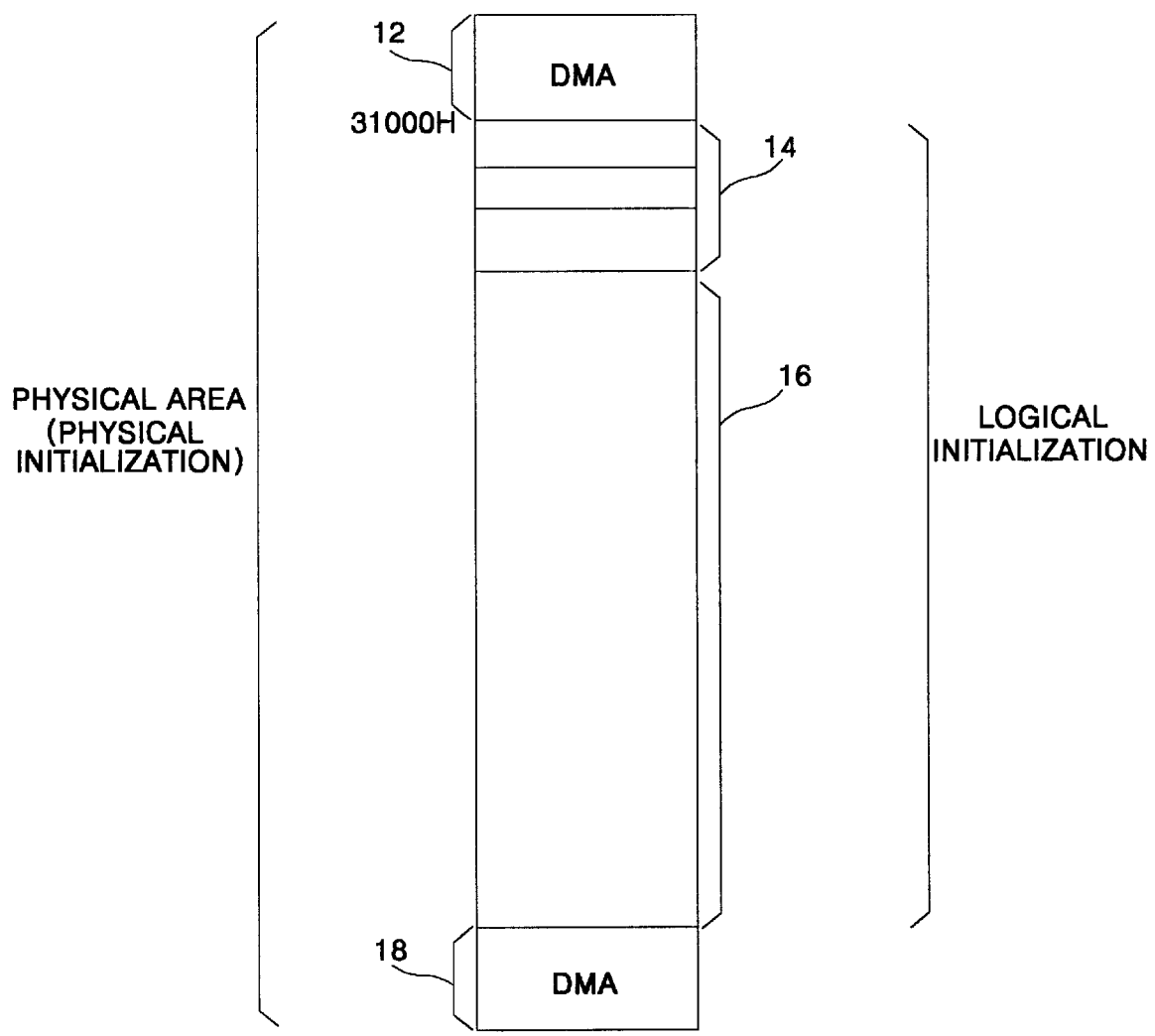
FIG. 3 depicts a logical standard of the conventional DVD-RAM.

The initializing process is performed by means of the drive 10 connected to the host computer 20 as shown in FIG. 1.

First, if a recording medium is loaded into the drive 10 in step 10, then the drive 10 is initialized to perform a recording or reproducing operation in step 11. In step 12, the drive 10 reads out a state of the loaded recording medium. In other words, the drive 10 reads out an initialization information, such as a position information where the physical initialization is completed, a position information of the non-initialized area, an information as to whether the logical initialization is completed and so on, from the recording medium. Then, in step 13, the driver 10 confirms whether or not an initialization for a manager area of the recording medium is completed. At this time, the drive 10 confirms whether or not the initialization for the manager area of the recording medium is completed on a basis of the position information of the non-initialized area detected in the step 12. If it is confirmed that the manager area is not initialized in the step 13, then the drive 10 informs the host computer 20 of a busy state, that is, a unrecordable mode. Then, the drive 10 performs a physical initialization for the manager area in step 15. At this time, the physical initialization is performed by allowing the drive 10 to record a test data onto the manager area and, thereafter, to certify it. If the physical initialization for the manager area is completed, then the drive 10 informs the host computer 10 that a physical initialization for the manager area has been completed in step 16. In step 17, the drive 10 performs a logical initialization for the manager area by means of the host computer 20. If the logical initialization for the manager area has been completed, then the drive 10 informs the host computer 20 of the release of busy state, that is, a recordable mode.

Subsequently, in step 19, the drive 10 confirms whether or not an information recording command has been sent from the host computer 20. Also, if it is confirmed that the initialization for the manager area has been completed in the step 13, then the drive 10 progresses into the step 19 to determines whether or not an information recording command is inputted from the host computer 20. In step 20, if the information recording information is not inputted from the host computer 20, then the drive 10 determines whether or not an initialization for the user data area should be performed on a basis of a non-initialization position information detected in the step 13. If it is determined that a non-initialized portion exists in the user data area in the step 20, the drive 10 performs a physical initialization for the non-initialized area in step 22. At this time, the drive 10 records a test data onto the non-initialized area and thereafter certify it, thereby performing the physical initialization. Then, if an interrupt signal is generated from the host computer 20 in the course of performing the physical initialization for the non-initialized area at the drive 10, then it stops performing the physical initialization operation and return into the step 19 to confirm whether or not an information recording command has been inputted from the host computer 20. Also, the drive 10 records a position information at which the physical initialization has been completed onto a specified area of the recording medium. On the other hand, if it is determined that a non-initialized portion dose not exist in the user data area on a basis of the non-initialization position information in the step 20, it progresses into step 23 to wait until an information recording command is inputted from the host computer 20.

Meanwhile, if an information recording command is inputted from the host computer 20 in the step 19, then the drive 10 progresses into step 24 to confirm whether or not the physical initialization for a position to be recorded with the user data has been completed, thereby setting a recording mode. More specifically, the drive 10 provides a confirmation as to whether the physical initialization for a position to be recorded with a user data has been completed on a basis of the position information of the non-initialized area detected in the step 12 and the position information to be recorded with a user data. If it is confirmed that a position to be recorded with a user data is not initialized physically in the step 24, then a recording/certification mode is set to progress step 30. In the step 30, the drive 30 records a user data for each predetermined recording unit, for example, for one rotation track unit from a position to be recorded with a user data and certifies the recorded data. In other words, the drive 10 records and certifies an information for one rotation track when a user data is recorded onto a non-initialized user data area. This recording/certification process for one rotation track unit will be described later. In step 31, the drive 10 performs the recording/certification process for the one rotation track unit repeatedly until it has completed a recording of a user data. If a user data to be recorded on the recording medium no longer exists in the step 31, then the drive 10 progresses into the step 20 after the completion of user data recording to confirm whether or not the non-initialized area exists. Accordingly, if a non-initialized area exists in the recording medium after the drive 10 has completed a recording of a user data according to a command from the host computer 20, then the drive 10 performs an initialization for the non-initialized area until next recording command is inputted.

Figure 5:
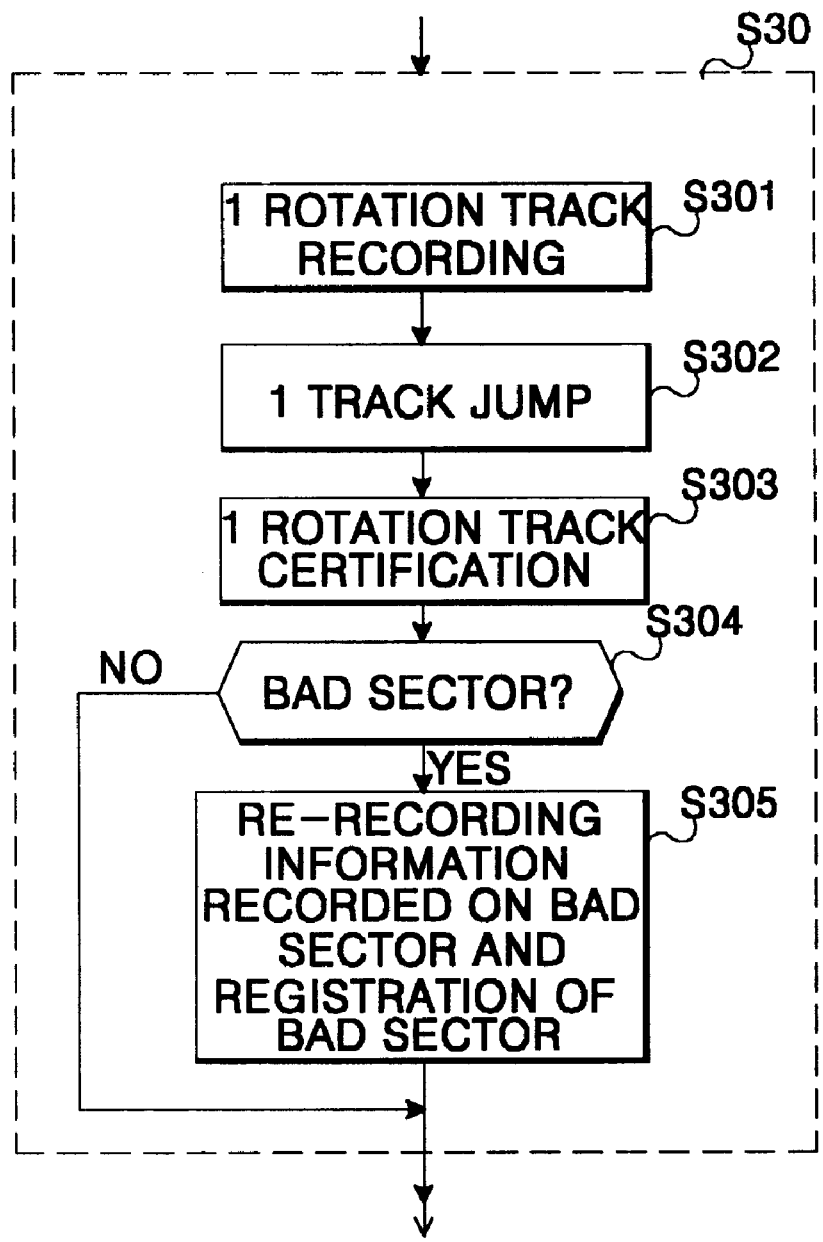
FIG. 5 is a flow chart for representing a recording/certification process per one rotation track unit included in FIG. 4.
Figure 6:
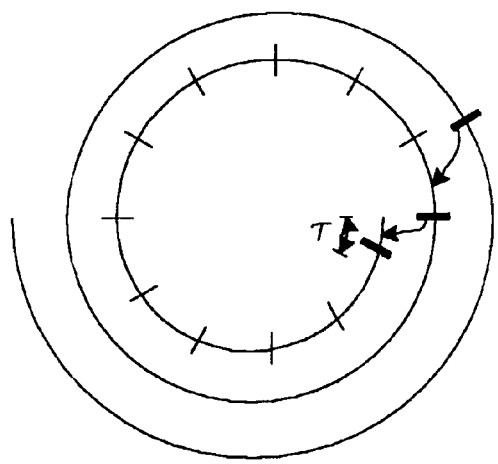
FIG. 6 is a view for explaining one track jump method included in FIG. 5.
Figure 7:
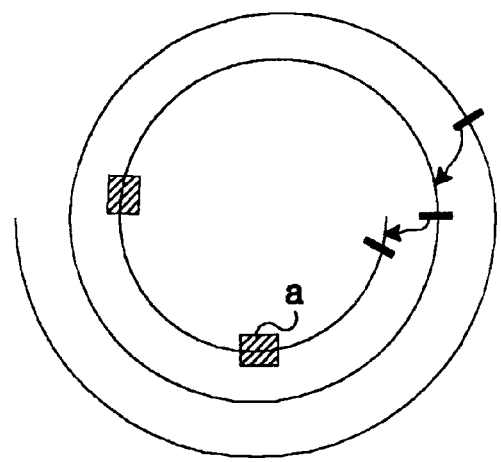
FIG. 7 is a view for explaining a method of rewriting a data when a bad sector exists in FIG. 5.

Meanwhile, if it is confirmed that the physical initialization for a position to be recorded with a user data has been completed in the step 24, then the drive goes into the step 25 to be set to the usual recording mode. In step 25, the drive 10 records a user data transferred from the host computer 20 onto the recording medium in a conventional recording method. Further, if a non-initialized area is detected in the course of recording a user data in the step 26, then the drive 10 is set to the recording/certification mode to progress into the step 30. Accordingly, the drive 10 records and certifies a user data for one rotation track unit. Otherwise, if not, the drive 10 performs the steps 25 and 26 repeatedly until it has completed a recording of a user data in step 27. If a user data to be recorded on the recording medium no longer exists in the step 27, then the drive 10 progresses into the step 20 after a completion of the recording operation to confirm whether or not a non-initialized area exists in step 28. Accordingly, if a non-initialized area exists in the recording medium after the drive 10 has completed a recording of a user data according to a command from the host computer 20, then the drive 10 performs an initialization for the non-initialized area until next recording command is inputted. Referring to FIG. 5, there is shown a flow chart for explaining a recording/certification process for one rotation track unit. In step 301 of FIG. 5, the drive 10 records a user data onto one rotation track unit of the non-initialized user data area. In step 302, the drive 10 jumps one track in the inner or outer circumference direction of a recording medium as shown in FIG. 6. In this case, the drive 10 has a predetermined stabilization interval τ after the track jump as seen from FIG. 6, and then performs the next operation. Then, in step 303, the drive 10 reproduces and certifies a user data recorded on the one rotation track. Subsequently, in step 304, it is confirmed whether or not any bad sector have been detected in the one rotation track recorded with a user data. If any bad sectors are detected in the step 304, then the drive 10 records an information sequentially to sectors except for the bad sectors from an information recorded in the first bad sector a within the one rotation track as shown in FIG. 7. Also, the drive 10 registers a position information for the bad sectors detected in the one rotation track to the defect management area(DMA) of the recording medium and completes a recording for the one rotation track. In this case, if no bad sector exist in the one rotation track, then it is to be understood that the drive 10 provides three times tracking for the purpose of a recording/certification and a re-recording with respect to the corresponding one rotation track. Otherwise, if not in the step 304, the drive 10 completes a recording for the one rotation track. In this case, if no bad sector exists in the one rotation track, then it is to be understood that the drive 10 provides twice tracking for the purpose of a recording/certification with respect to the corresponding one rotation track.

Accordingly, it becomes possible to assure the responsibility of data without requiring a considerably long initialization time in the Prior art by recording and certifying a user data at the same time when the drive provides a judgment as to whether or not a loaded recording medium is initialized to thereby record a user data onto the non-initialized area. Also, if it is determined by the driver that a loaded recording medium has not been initialized, then the drive informs the host computer of this fact to allow the host computer to execute an application program, that is, a recording medium initializing program, whereby it may provide a initialization control for the recording medium as mentioned above.

As described above, according to the present invention, it becomes possible to assure the responsibility of a recorded data without requiring an additional time for the initialization operation like in the Prior art by recording and certifying a data for each predetermined physical unit when the drive determines whether or not a loaded recording medium has been initialized to record a user data onto the non-initialized area.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of initializing a rewritable recording medium, comprising the steps of:
    (A) determining whether or not a physical initialization for the recording medium should be performed; and
    (B) automatically performing the physical initialization for each predetermined physical unit of the recording medium in accordance with a result in the step (A),
    wherein the step (A) determines based on position information of a non-initialized area, the information having been recorded on a predetermined area of the recording medium.

2. The method as claimed in claim 1, wherein the predetermined physical unit is one rotation unit region defined at the recording medium physically.

3. The method as claimed in claim 1, wherein the step (B) includes the steps of:
    (b1) confirming whether or not an initialization of a manager area set to manage a user data recorded on the recording medium has been completed; and (b2) performing an initialization for each predetermined physical unit of the recording medium on a basis of a position information of the non-initialized area in accordance with a result of the step (b1).

4. The method as claimed in claim 3, wherein the step (b1) comprises determining in accordance with whether or not the position information of the non-initialized area includes an manager area set in the recording medium in advance.

5. A method of initializing a rewritable recording medium, comprising the steps of:
   (A) reading out a position information of a non-initialized area, the information having been recorded on a predetermined area of the recording medium; and
   (B) detecting the presence of a recording command for recording a user data on the recording medium;
   (C) automatically setting an initialization mode in accordance with a result in the step (B); and
   (D) initializing the non-initialized area for each predetermined physical unit in accordance with the initialization mode.

6. The method as claimed in claim 5, wherein the predetermined physical unit is one rotation unit region defined at the recording medium physically.

7. The method as claimed in claim 5, wherein the step (C) includes setting an initialization mode for recording and certifying a certain data for each predetermined physical unit on a basis of the position information of the non-initialized area when the recording command for recording the user data does not exist.

8. The method as claimed in claim 5, wherein the step (C) includes setting an initialization mode for recording and certifying a user data inputted along with the recording command for each predetermined physical unit on a basis of the position information of the non-initialized area when the recording command for recording the user data exists.

9. The method as claimed in claim 5, wherein the step (C) includes the steps of:
   (d1) determining whether or not an initialization of a manager area set to manage a user data recorded on the recording medium has been completed; and
   (d2) performing an initialization for each predetermined physical unit of the recording medium on a basis of a position information of the non-initialized area in accordance with a result of the step (d1).

10. The method as claimed in claim 9, wherein the step (d1) comprises determining in accordance with whether or not the position information of the non-initialized area includes an manager area set in the recording medium in advance.

11. The method as claimed in claim 5, wherein the step (D) includes the steps of:
    (d1) performing an initialization for each predetermined physical unit;
    (d2) recording a predetermined data on the predetermined physical unit;
    (d3) certifying the recorded data by moving the front of the predetermined physical unit; and
    (d4) registering a defect area into a defect management area of the recording medium when the defect area is detected in the step (d3).

12. The method as claimed in claim 11, further comprising the step of sequentially re-recording a data recorded on the defect area onto the remaining area except for the defect area on a basis of the detected defect area.

13. A method of recording data on a rewritable recording medium, comprising the steps of:
    (A) reading out a position information of a non-initialized area, the information having been recorded on a predetermined area of the recording medium; and
    (B) choosing and setting a recording mode for recording a user data on a basis of the position information of the non-initialized area and a position information to be recorded with the user data; and
    (C) recording the user data for each predetermined physical unit in accordance with the recording mode.

14. The method as claimed in claim 13, wherein the predetermined physical unit is one rotation unit region defined at the recording medium physically.

15. The method as claimed in claim 13, wherein the step (B) includes setting a mode for recording the user data without a certification of a data recorded when a position to be recorded with the user data is already initialized.

16. The method as claimed in claim 13, wherein the step (B) includes the steps of:
    (b1) recording the user data for each predetermined physical unit when a position to be recorded with the user data is not initialized;
    (b2) certifying the recorded data by moving the front of the predetermined physical unit; and
    (b3) setting a recording mode including the step of registering a defect area into a defect management area of the recording medium when the defect area is detected in the step (b2).

17. An initializing apparatus for a rewritable recording medium, comprising:
    means for reading out a position information of a non-initialized area recorded on a predetermined area of a loaded recording medium;
    means for setting a recording mode for recording a user data on a basis of the position information of the non-initialized area and a position information to be recorded with the user data; and
    means for recording the user data for each predetermined physical unit in accordance with the recording mode.

18. An initializing apparatus for a rewritable recording medium, comprising:
    means for reading out a position information of a non-initialized area recorded on a predetermined area of a loaded recording medium;
    means for detecting the presence of a recording command for recording a user data on the recording medium;
    means for setting an initialization mode in accordance with a detected result as to the presence of the recording command; and
    means for initializing the non-initialized area for each predetermined physical unit in accordance with the initialization mode.

19. A method for recording data on a rewritable recording medium, comprising:
    reading from the medium position information of initialized areas and non-initialized areas of the medium;
    determining from the position information whether a manager area has been completely initialized;
    initializing the manager area prior to writing to the medium if the manager area has not been completely initialized;

receiving a recording command specifying a recording area on the medium;

determining whether the recording area has been initialized; and writing data to the recording area if the recording area has been initialized.

20. The method of claim 19, further comprising:

initializing any non-initialized areas of the medium until the recording command is received.

21. The method of claim 19, further comprising:

writing and certifying data on the recording area if the recording area has not been initialized.

22. The method of claim 21, further comprising:

rewriting data on the recording area if the writing and certifying step determines that a bad sector exists in the recording area.

* * * * *